Figure 1:
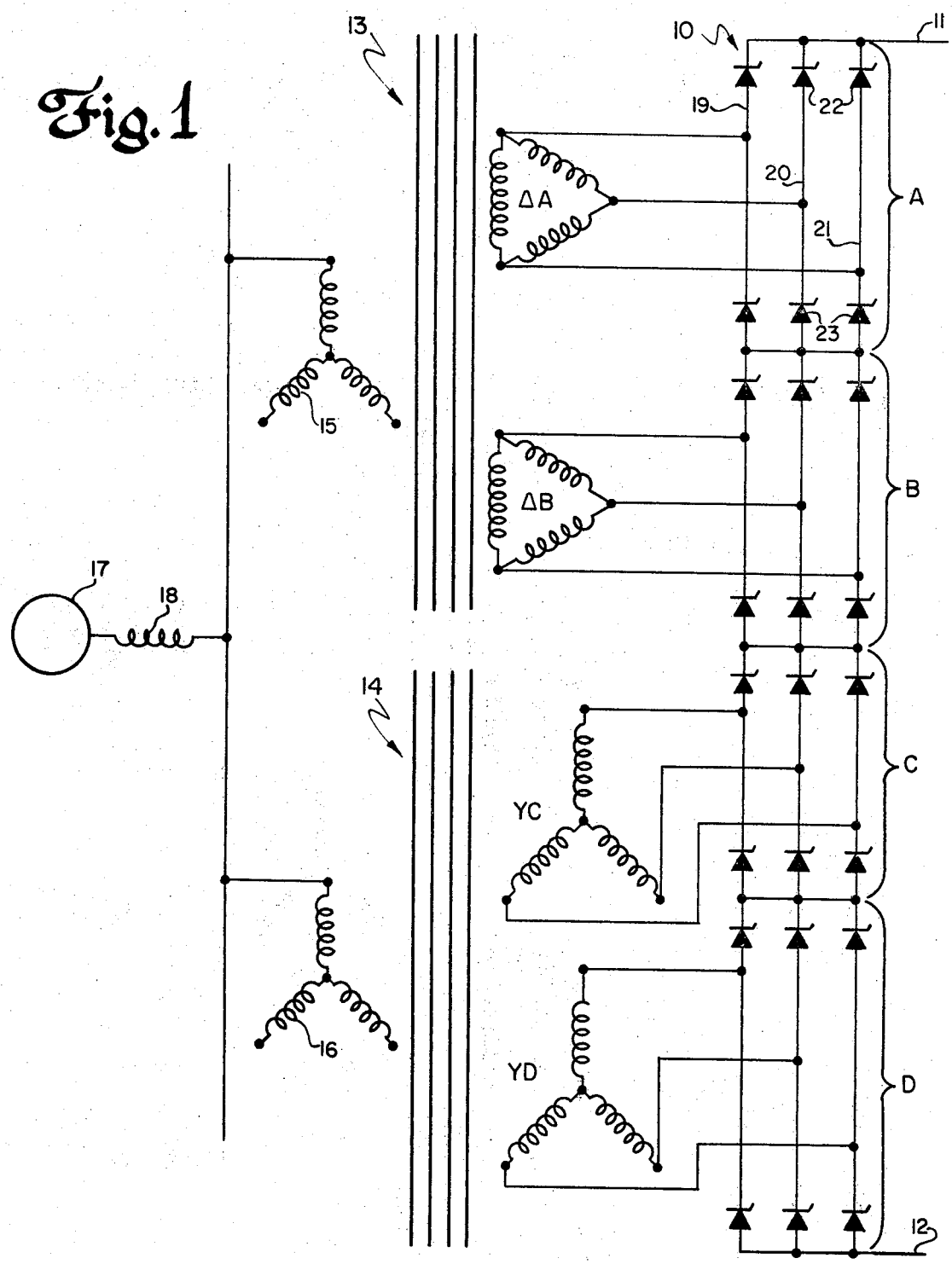

United States Patent [19]

Stairs

[11] 3,769,570
[45] Oct. 30, 1973

[54] AC-DC CONVERTER CIRCUIT FOR MINIMIZING HARMONICS

[75] Inventor: Colin Mackenzie Stairs, Peterborough, Ontario, Canada

[73] Assignee: Canadian General Electric Company Limited, Toronto, Ontario, Canada

[22] Filed: Sept. 29, 1971

[21] Appl. No.: 184,821

[52] U.S. Cl. ............................ 321/9 R, 321/27 R
[51] Int. Cl. .......................................... H02m 1/12
[58] Field of Search .............................. 321/9, 27 R

[56] References Cited
UNITED STATES PATENTS

| | | | |
|---|---|---|---|
| 3,280,334 | 10/1966 | Uhlmann et al. | 321/27 |
| 2,820,189 | 1/1958 | Uhlmann | 321/27 |
| 3,448,286 | 6/1969 | Stackegard | 321/27 |
| 3,531,710 | 9/1970 | Breuer et al. | 321/14 |

FOREIGN PATENTS OR APPLICATIONS

| | | | |
|---|---|---|---|
| 390,363 | 8/1965 | Switzerland | 321/27 |
| 477,389 | 1938 | Great Britain | 321/27 |

Primary Examiner—William M. Shoop, Jr.
Attorney—John F. Ahern et al.

[57] ABSTRACT

According to the invention a converter group has four bridges A to D of controlled coverters connected in series in the order A, B, C and D respectively. Each bridge A and B is connected to a separate delta winding of one three phase transformer, and each bridge C and D is connected to a separate wye winding of another three phase transformer. Each transformer has a wye winding connected to an AC system. The converters in the respective legs of the bridges are fired in the proper phase sequence at approximately 15 electrical degree intervals. This is a hybrid combination of two 12-pulse groups that is controlled to operate as an imperfect 24-pulse converter group so as to reduce the total magnitude of the 11th and 13th harmonics which are generated by the converters.

10 Claims, 2 Drawing Figures

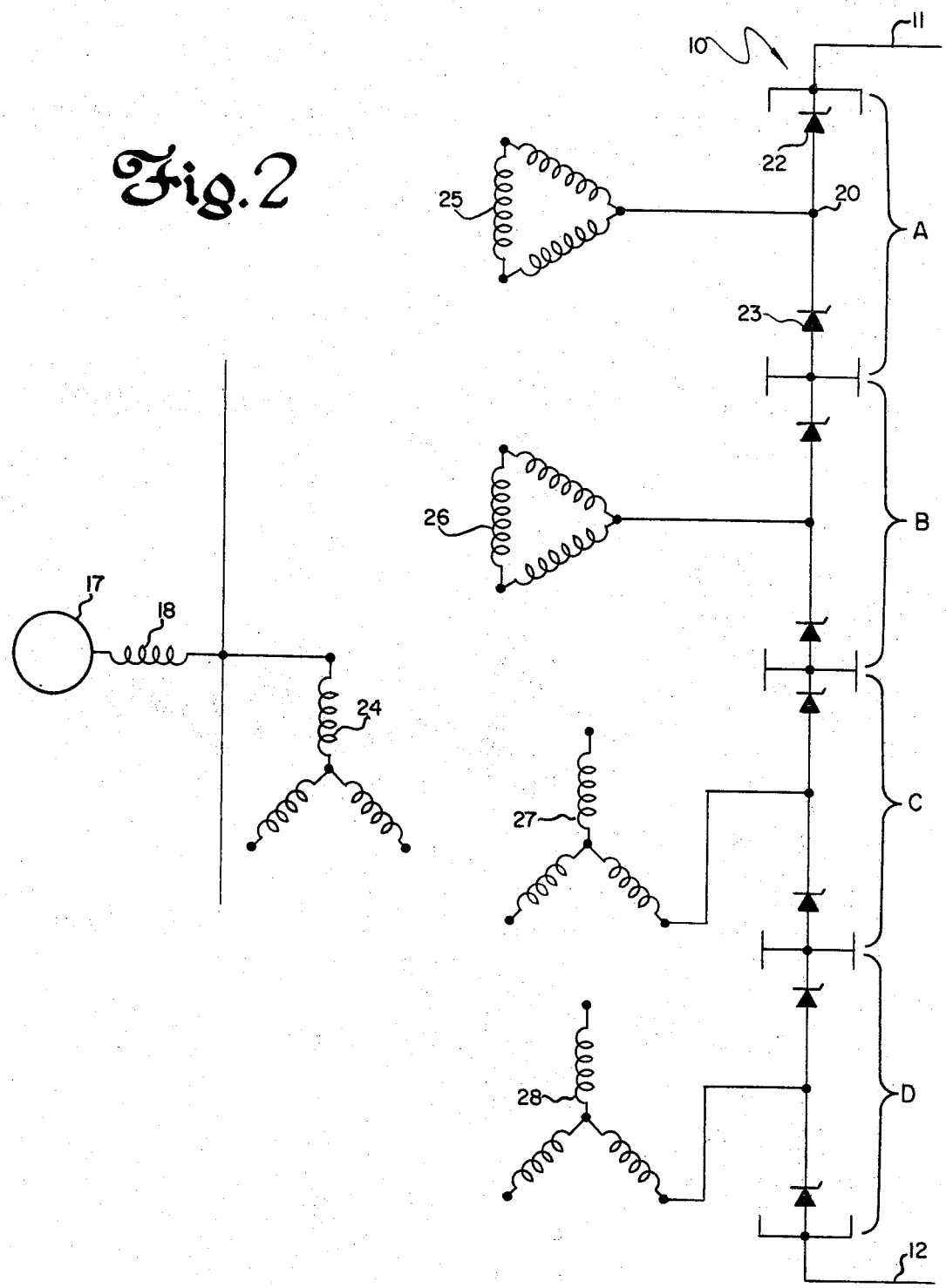

AC-DC CONVERTER CIRCUIT FOR MINIMIZING HARMONICS

This invention relates to an imperfect 24-pulse converter circuit designed to minimize harmonics in the circuit.

The harmonics generated in an HVDC terminal depend largely upon the number of separate commutation pulses in the converters of the terminal. Filtering is usually provided to reduce the interference which the harmonics cause to acceptable levels. A small number of pulses will require more filtering than a large number for similar results. The design of a power converting installation is therefore a compromise between the number of pulses and the amount of filtering provided. In very large installations such as HVDC converter terminals it is common practice to use six or more pulses, 12 being quite common. Needless to say, the cost of the transformers and converters increases as the number of pulses increases, and the cost of filters decreases as the number of pulses increase.

The object of this invention is to minimize the total cost of the transformers, converters and filters required for an HVDC system.

According to the invention a converter group has four bridges A to D of controlled converters connected in series in the order A, B, C and D respectively. Each bridge A and B is connected to a separate delta winding of one three phase transformer, and each bridge C and D is connected to a separate wye winding of another three phase transformer. Each transformer has a wye winding connected to an AC system. The converters in the respective legs of the bridges are fired in the proper phase sequence at approximately 15 electrical degree intervals in the order A, C, B and D respectively. This is a hybrid combination of two 12-pulse converter groups that is controlled to operate as an imperfect 24-pulse converter group so as to reduce the total magnitude of the 11th and 13th harmonics which are generated by the converters. An alternate configuration has three single phase transformers connected externally in a bank with two delta and two wye windings on the converter side and a single wye winding on the AC source side.

The invention will now be described in more detail with reference to the accompanying drawings, in which FIG. 1 is a circuit diagram of one embodiment of the invention; and FIG. 2 is a circuit diagram of another embodiment of the invention.

In FIG. 1 there is shown a terminal for an HVDC system which is capable of operating either as a rectifier or as an inverter. It has a converter group 10 consisting of four bridges A to D connected in series between the DC lines 11 and 12. Bridges A and B are connected to separate delta windings ΔA and ΔB respectively of transformer 13, and bridges C and D are connected to separate wye windings YC and YD respectively of transformer 14. Transformer 13 has another winding 15 and transformer 14 has another winding 16, both of which are wye windings connected to an AC system 17 having the impedance represented at 18. Bridges A to D each contain three legs with two or a multiple thereof of controlled converters 22 and 23 per leg, for example, thyristors or mercury arc rectifiers. The three legs of bridge A are identified by numerals 19, 20 and 21, and each one of these legs is shown with two thyristors 22 and 23 therein means for controlling converters 22 and 23 are not illustrated herein but such means are well known to those skilled in the art. One such means specifically utilized to control such controlled converters when such converters are thyristors is illustrated in FIG. 6 of a paper entitled "EHV-DC Simulator" by Judson, Hunter and Wilson published in the *IEEE* on Power Apparatus and Systems, Vol. PAS-85, No. 11, November 1966.

If the circuit shown in FIG. 1 had only one delta winding connected to one bridge and one wye winding connected to another bridge, e.g., windings ΔA and YC connected to bridges A and C respectively, the converter group would be a full 12-pulse converter with firing of the converters at 30° intervals. The circuit shown in FIG. 1 consists of two delta windings ΔA and ΔB and two wye winding YC and YD connected to the four bridges A to D respectively. The converters of the bridges are fired in the proper phase sequence at approximately 15° intervals for a 24-pulse output. Although the general pulse form from this hybrid circuit is somewhat imperfect when compared with the form from a full 24-pulse circuit, the hybrid circuit does have one important advantage in common with the full 24-pulse circuit; both reduce 11th and 13th harmonics, thereby reducing harmonic filtering requirements. However, the hybrid circuit does lead to a larger VAR loading on the circuit. In some applications this increase in VAR loading may well be warranted in view of the savings possible in filtering equipment.

FIG. 2 shows another arrangement of transformer windings for converter group 10. In this arrangement three single phase transformers are connected externally of the transformers in a three phase bank having a single wye winding circuit 24 connected to the AC system 17 and two delta winding circuits 25, 26 and two wye winding circuits 27, 28 connected to the respective bridges of converter group 10 as in FIG. 1. Winding groups 25, 26, 27 and 28 bear the same phase relation to each other and to the converter bridges as do windings ΔA, ΔB, YC and YD respectively, and the converters are fired in the same order. Hence the operation of the converter group is essentially the same in both instances.

What I claim as new and desire to secure by Letters Patent of the United States is:

1. An imperfect 24-pulse converter group comprising AC voltage transforming means having wye connected windings connected to a three phase AC system, first and second delta connected windings, and third and fourth wye connected windings; a converter group having four converter bridges A to D connected in series in the order A, B, C and D respectively, each one of said bridges being a three-legged full wave bridge of controlled converters; DC terminals on said converter group; conductors connecting said first winding to the respective legs of said bridge A, said second winding to the respective legs of said bridge B, said third winding to the respective legs of said bridge C, and said fourth winding to the respective legs of said bridge D; and means for controlling and firing said controlled converters in phase sequence at approximately 15° intervals.

2. The converter group defined in claim 1 wherein said voltage transforming means consists of two three phase transformers of which each one has a wye winding connected to said AC system, one has said first and second delta winding, and the other has said third and fourth wye windings.

3. The converter group defined in claim 1 wherein said voltage transforming means consists of a bank of single phase transformers each having a single wye winding on the AC and two wye and two delta windings on the DC side.

4. The converter group defined in claim 1, wherein said controlled converters are thyristors.

5. The converter group defined in claim 1, wherein said controlled converters are mercury arc rectifiers.

6. The converter group defined in claim 2 wherein said controlled converters are thyristors.

7. The converter group defined by claim 3 wherein said controlled converters are thyristors.

8. The converter group defined in claim 2 wherein said controlled converters are mercury arc rectifiers.

9. The converter group defined in claim 3 wherein said controlled converters are mercury arc rectifiers.

10. The method of operating an A.C. to D.C. converter group comprising A.C. voltage transforming means having wye connected windings connected to a three-phase A.C. system, first and second delta windings, and third and fourth wye connected windings, a converter group having four converter bridges A to D interconnected in series in the order A, B, C and D, respectively, each one of said bridges being a three legged full-wave bridge of controlled converters, D.C. terminals on said semiconductor group, conductors interconnecting said first winding to the respective legs of said bridge A, said second windings to the respective legs of said bridge B, and said third winding to the respective legs of said bridge C, and said fourth winding to the respective legs of said bridge D, in order to produce an imperfect 24-pulsed converter group, said method comprising firing said controlled converters in phase sequence at approximately 15° intervals.

* * * * *